United States Patent [19]

Albrecht et al.

[11] Patent Number: 4,576,103

[45] Date of Patent: Mar. 18, 1986

[54] FEED DRIVE FOR A STITCH GROUP SEWING MACHINE

[75] Inventors: Ernst Albrecht, Hochspeyer; Edgar Busch, Trippstadt, both of Fed. Rep. of Germany

[73] Assignee: Pfaff Industriemaschinen GmbH, Fed. Rep. of Germany

[21] Appl. No.: 755,064

[22] Filed: Jul. 15, 1985

Related U.S. Application Data

[63] Continuation-in-part of Ser. No. 615,461, May 30, 1984, Pat. No. 4,549,491.

[30] Foreign Application Priority Data

Jun. 3, 1983 [DE] Fed. Rep. of Germany ....... 3320158
Dec. 3, 1984 [DE] Fed. Rep. of Germany ....... 3444061

[51] Int. Cl.$^4$ .............................................. D05B 3/02
[52] U.S. Cl. ....................................... 112/73; 112/449
[58] Field of Search ................. 112/73, 70, 65, 158 R, 112/158 B, 158 E

[56] References Cited

U.S. PATENT DOCUMENTS 2,411,493  11/1946  Wood .................................. 112/73
3,460,496  8/1969  Meier .............................. 112/158 B

FOREIGN PATENT DOCUMENTS 1763690  8/1982  Fed. Rep. of Germany .

Primary Examiner—H. Hampton Hunter
Attorney, Agent, or Firm—McGlew and Tuttle

[57] ABSTRACT

A feed drive for a stitch group sewing machine includes a cam plate serving to drive a work clamp. The cam plate is connected to a controllable clutch driven from the drive motor of the sewing machine. In order to keep the stitch length constant at varying lengths of the stitch group, the output speed of the clutch is controllable by a control device as a function of the rotational speed of the sewing machine of the transmission ratio of a gearing between the cam plate and the work clamp which determines the length of the stitch group, and of the adjusted stitch length. The stitch group to be sewn may be divided into two sections having their stitch lengths variable independently of each other, by providing that a switch responsive to a partial revolution of the cam plate corresponding to the length of the first section, alternately connects one of two potentiometers which determine the stitch length, to the control circuit of the clutch.

7 Claims, 8 Drawing Figures

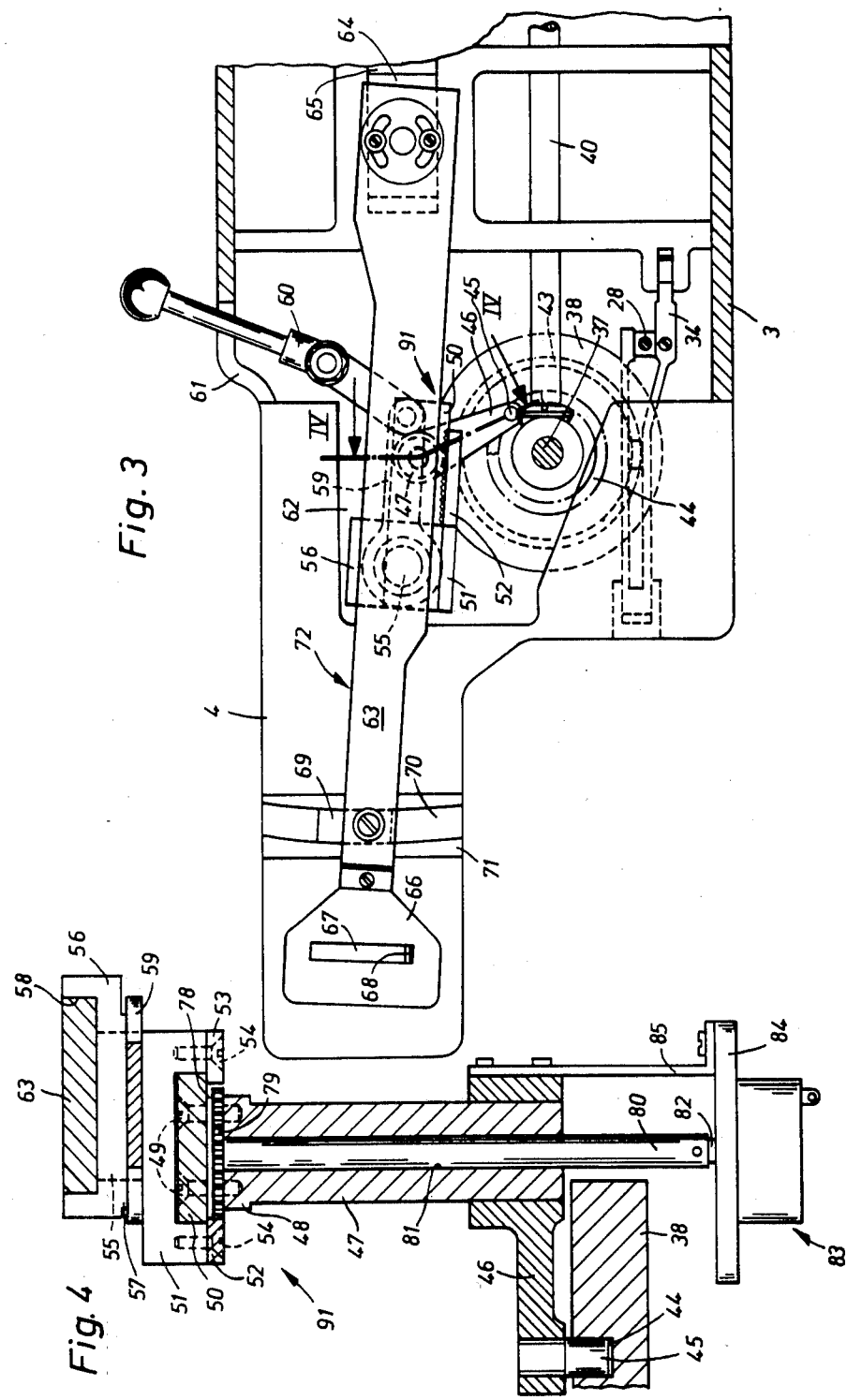

FEED DRIVE FOR A STITCH GROUP SEWING MACHINE

CROSS REFERENCE TO RELATED APPLICATION

The present application is a continuation-in-part application of Ser. No. 615,461 filed May 30, 1984 now U.S. Pat. No. 4,549,491, dated Oct. 29, 1985.

FIELD AND BACKGROUND OF THE INVENTION

The present invention relates in general to sewing machines and, in particular to a new and useful stitch group sewing machine which includes a cam plate which is controllable to vary the length of a stitch group to be sewn.

A stitch group sewing machine comprises a drive motor, a needle which is movable upwardly and downwardly and swingable laterally, and a work holder which is movable by means of a cam plate and by means of a transmission mechanism that operates transversely to the sewing plane of the needle, with the length of a stitch group to be sewn being adjustable by varying the ratio of the transmission mechanism, is disclosed in U.S. Pat. No. 2,411,493. This known stitch group sewing machine is a buttonhole sewing machine with a work holder gripping the work in the region of the buttonhole to be formed. The work holder is driven by a first gearing controlled cam plate which makes one complete revolution during the formation of a buttonhole. A first cam slot moves the work holder parallel to the longitudinal axis of the sewing machine, and hence in lengthwise direction of the buttonhole to be formed. A second cam slot moves the work holder crosswise to the longitudinal axis of the of the sewing machine in connection with a second gearing. The needle bar is mounted in a pivotably mounted frame and executes swinging movements transverse to the longitudinal axis of the sewing machine for the formation of zig-zag stiches.

The first gearing contains an angle lever, whose one leg carries a sensor engaging in the cam slot and whose other leg comprises a link guide. In the link guide a sliding block of a pitman connected with the work holder engages in the link guide. By displacment of the sliding block in the link guide the transmission of the bearing and hence the amount of forward movement of the work holder parallel to the longitudinal axis of the sewing machine, can be varied and in this way the length of the buttonhole to be formed can be adjusted.

The cam plate is intermittently set into rotation by a one way clutch which is in drive connection with the main shaft of the sewing machine via a drive mechanism. The transmission ratio of the drive mechanism can be adjusted similarly as for the first gearing, whereby the speed of rotation of the cam plate can be varied at constant rotational speed of the main shaft. In this manner the number of stitches which form the buttonhole can be varied.

If when changing the buttonhole length the number of stitches is to be varied as well to obtain a constant stitch length, the transmission ratio of the drive mechanism must be matched very exactly to the transmission ratio of the first gearing. This mutual adaptation or adjustment is time consuming and requires a certain skill and experience, so that generally it must be effected by a mechanic rather than by the seamstress.

To eliminate the danger of follow-up or continued running that exists in the operation of a one way clutch due to inertia, the known sewing machine is provided with an intermittently active brake device acting at the circumference of the cam plate. Since such a brake is subject to wear, and since the braking depends on the surface quality or the degree of soiling of the friction surfaces so that no assurance for smooth operation of the cam plate is given especially at high speeds, such a drive system is not suitable for modern sewing machines, for which generally high speeds are required, to reduce the sewing time.

SUMMARY OF THE INVENTION

The invention provides a stitch group sewing machine wherein the ratio of speed of rotation of the cam plate to the speed of rotation of the sewing machine required for obtaining the desired number or length of stitches of the group to be sewn can be adjusted in a simple and yet exact manner and is maintained at the set value during sewing even at high rotational speeds of the sewing machine.

It is possible by electrical means and hence in an especially simple manner in terms of operation to adjust or vary the speed ratio between the sewing machine and the cam plate executing the forward movement of the work holder. Thus, while the length of the stitch group remains unchanged, the number of stitches and hence the basic adjustment of the stitch length can be set or changed. If, however, only the length of the stitch group is changed, then, as a function of the set transmission ratio of the gearing, the output speed of the controllable clutching device for the cam plate and hence the number of stitches is automatically varied as well, so that the stitch length, one set, is preserved unchanged. Further it is possible to vary the length of the stitch group and the stitch length simultaneously, so that the basic data contained in a cam plate can be varied in many ways.

If the output speed of the clutching device is substantially lower than that of the drive motor, an inventive arrangement makes it possible to reduce the speed already in the connection between the drive motor and the clutching device. With such a provision, the slip within the clutching device is smaller, so that less heat is produced and the life of the clutch is extended.

Another arrangement on the other hand, makes the construction particularly compact and space saving.

With a still further feature of the invention, the input speed of the clutching device can be reduced while making the structure compact at the same time by combining the motor and the clutching device into a single constructional unit and embodying the interposed transmission, for example, as a space saving planetary gear.

A certain type of stitch group referred to as bar seam consists of one or more rows of straight, so-called tension stitches and a plurality of zig-zag stitches covering the tension stitches. The tension stitches have the purpose to give the bar seam a high tensile rigidity. This is best achieved with long stitch lengths. If however, the work holder is driven by the cam plate continuously rather than intermittently, the desire for great stitch lengths conflicts with the then occurring danger of needle breakage and damage to the work. Under these circumstances the tension stitches are advantageously formed with an average stitch length of 2.5 mm, and this for short as well as for long bar seams.

The possibility exists, at an unchanged length of the bar seam, to leave the number and hence the length of the tension stitches unchanged whereas the number and hence the length of the zig-zag stitches is varied, owing to which bar seams adapted to the particular purpose of use and type of cloth and having always an optimum tension stitch length of 2.5 mm and selectively narrow or wide zig-zag stitches can be formed. When changing the length of the bar seam, the number of tension stitches is varied as a function of the particular length of the bar seam by a corresponding variation of the speed of the cam plate, in such a way that also in this case, the optimum tension stitch length of 2.5 mm is maintained. With the invention it is possible to vary the basic data of a stitch group contained in a control cam plate relatively to each other also sectionwise, so that with a single cam plate a plurality of stitch group type and modifications not previously attainable in the prior art can be achieved.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a sectional view along line III—III of FIG. 2;

FIG. 4 is a sectional view along line IV—IV of FIG. 3;

DESCRIPTION OF THE PREFERRED EMBODIMENTS

Figure 1:
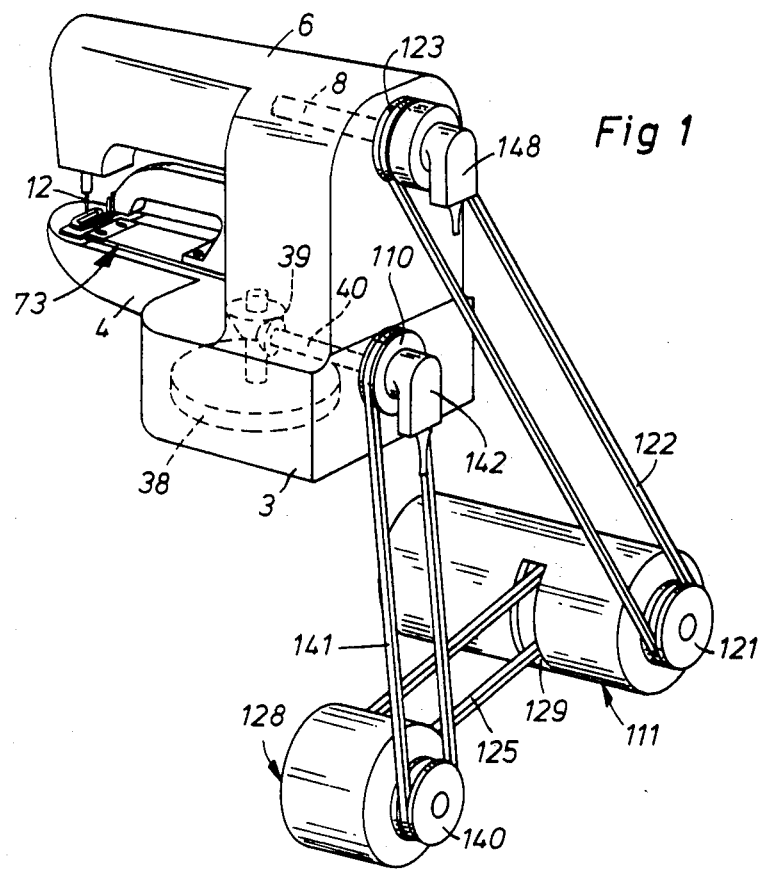
FIG. 1 is a perspective view of a stitch group sensing machine comprising a drive motor and a separate clutching device for driving the cam plate.

The sewing machine shown in the drawings comprises a housing 1 having a support plate 2, a pedestal 3, a supporting arm 4, a standard 5, and an arm 6 which terminates in a head 7. In arm 6 an arm shaft 8 is mounted which drives a needle bar 11 by way of a crank 9 and a pitman 10. In the needle bar 11 a thread carrying needle 12 is fastened, which cooperates with a shuttle or looper not shown for the formation of stitches.

The needle bar 11 is received in a frame 13 which is mounted for displacement on a bolt 14 running parallel to the longitudinal axis of arm 6 and is connected with a connecting rod 15 running parallel to it. Connecting rod 15 forms the output element of a zig-zag stitch setter 16 with which the overstitch width of zig-zag stitches is controlled. The zig-zag stitch setter 16 is a known hinged stitch setter. It comprises a lever 17, whose one end is connected with the connecting rod 15.

On lever 17 an eccentric rod 18 is articulated, which engages around an eccentric 19. Eccentric 19 is driven by the arm shaft 8 via a gearing (not shown). The other end of lever 17 is connected with one end of a pitman 20. At the other end of pitman 20, a crank 22 fastened on a shaft 23 and extending substantially parallel to pitman 20 engages via a bolt 21. Shaft 23 is passed through the wall of arm 6 and carries on the outer side of arm 6 a crank 24. Crank 24 is connected via a link 25 with one arm of a two-arm crank 26. At crank 26 there engages an extension spring 27 which exerts on crank 26 an upwardly directed tensile force. At the other arm of crank 26 a tie rod 28 is articulated.

On tie rod 28 a holder 29 is clamped, which carries, spaced to one side, a freely rotatable roller 30. Under the action of an extension spring 27, roller 30 takes support on the generated surface of a spiral cam plate 31. Cam plate 31 is secured on the hub of a handwheel 32 rotatably mounted on stand 5 and is adjustable in fine degrees in connection with a known lock means (not shown). The lower end of tie rod 29 is articulated via a hinge piece 33 to a split lever 34 which is mounted in a lug 35 of pedestal 3. In lever 34 a sensing roller 36 is mounted.

In pedestal 3 a vertically extending shaft 37 is mounted which carries at its lower end a cam plate 38. Through a bevel gearing 39 shaft 37 is in drive connection with a shaft 40 carrying a pully 110.

Cam plate 38 carries on the bottom side a concentric cam track 43 provided with axially offset sections 43a, 43b, which cam track is associated with the sensing roller 36 and thus controls the setting of the zig-zag stitch setter 16 within the limits established by the manually adjustable cam plate 31 as cam plate 38 revolves.

In its top side, cam plate 38 has a cam groove 44. In groove 44 engages a sensing pin 45 which is fastened to the free end of a lever 46. Lever 36 is fastened to the lower end of a shaft 47 mounted vertically in pedestal 3. At the upper end of shaft 47 a widened shoulder 48 is formed. By screws 49 a supporting arm 50 is fastened on shoulder 48, and on it a slide 51 of U-shaped cross-section is slidably arranged. On the underside of slide 51, two holding strips 52, 53 which partially engage the supporting arm 50 from below are fastened by screws 54. In a recess of slide 51 (not shown) cup springs also not shown are arranged which press on the supporting arm 50 and bring about that slide 51 is secured by friction against automatic shifting. On the top side of slide 51 a flat cylindrical shoulder 55 is formed. On shoulder 55 a driver 56 is rotatably mounted which itself has a cylinder projection 57 and a flat straight recess 58. Projection 57 is embraced by one flat end of a link 59 whose other end is connected with a setting lever 60. Setting lever 60 is passed through a cutout 61 in pedestal 3.

Driver 56 protrudes through a cutout 62 in the supporting arm 4. In recess 58 of drive 57 a flat, plate type arm 63 is received which rests on the top side of supporting arm 4. One end of arm 63 is rotatably arranged on a sliding block 64, which is displacebly mounted in a guideway 65 of pedestal 3 parallel to the longitudinal axis of supporting arm 4. The other end of arm 63 is connected with an exchangeable work carrying plate 66, which has a rectangular opening 67 for needle 12 corresponding to the maximum size of the bar seam to be produced. The slot type stitch hole in supporting arm 4 is marked 68. On the underside of arm 63, near the work carrying plate 66, a sliding block 69 is rotatably arranged. The sliding block 69 is displaceably received in a guiding groove 70 formed in an insert 71 disposed in the supporting arm 4. In its lengthwise direction the guiding groove 70 has a form such that it imposes on the pivoting motion of arm 63 a longitudinal displacement as arm 63 pivots about the axis of rotation of sliding block 64, so that arm 63 carries out in the region of the opening 67 a straight movement crosswise to the longitudinal axis of supporting arm 4.

Arm 63 and work carrying plate 66 form a lower clamping jaw 72 of a work holder 73 which holds the work in plier fashion. On arm 63 an upper clamping jaw 74 is fastened. Clamping jaw 74 contains a spring loaded holding plate 75 provided with a matching opening (not shown) for passage of needle 12. Holding plate 75 can be lifted off the work carrying plate 66 in known manner through a roller 76 and a vertically movable pressure plate 77.

The holding strip 52 fastened on slide 51 is formed as a rack which laterally projects over slide 51; it meshes with a pinion 79 arranged in a recess of shoulder 48. Pinion 79 is secured on a shaft 80 which is disposed in a centered bore 81 of shaft 47. At the lower end of shaft 80 is clamped the setting shaft 82 of a continuously adjustable potentiometer 83. The housing 84 of potentiometer 83 is fastened to lever 46 by a bracket 85.

An upper segmental disc 86 is secured at the upper end of the shaft 37 carrying cam plate 38, and on a U-shaped holder 87 a lower segment disc 88. The upper segmental disc 86 cooperates with a inductive slot switch 89. The lower segmental disc 88 cooperates with a second inductive slot switch 90.

Lever 48 with the supporting arm 50 and slide 51, displaceable by lever 60 on supporting arm 50, form together with driver 36 a gearing 91 for the work holder 73.

Figure 5:
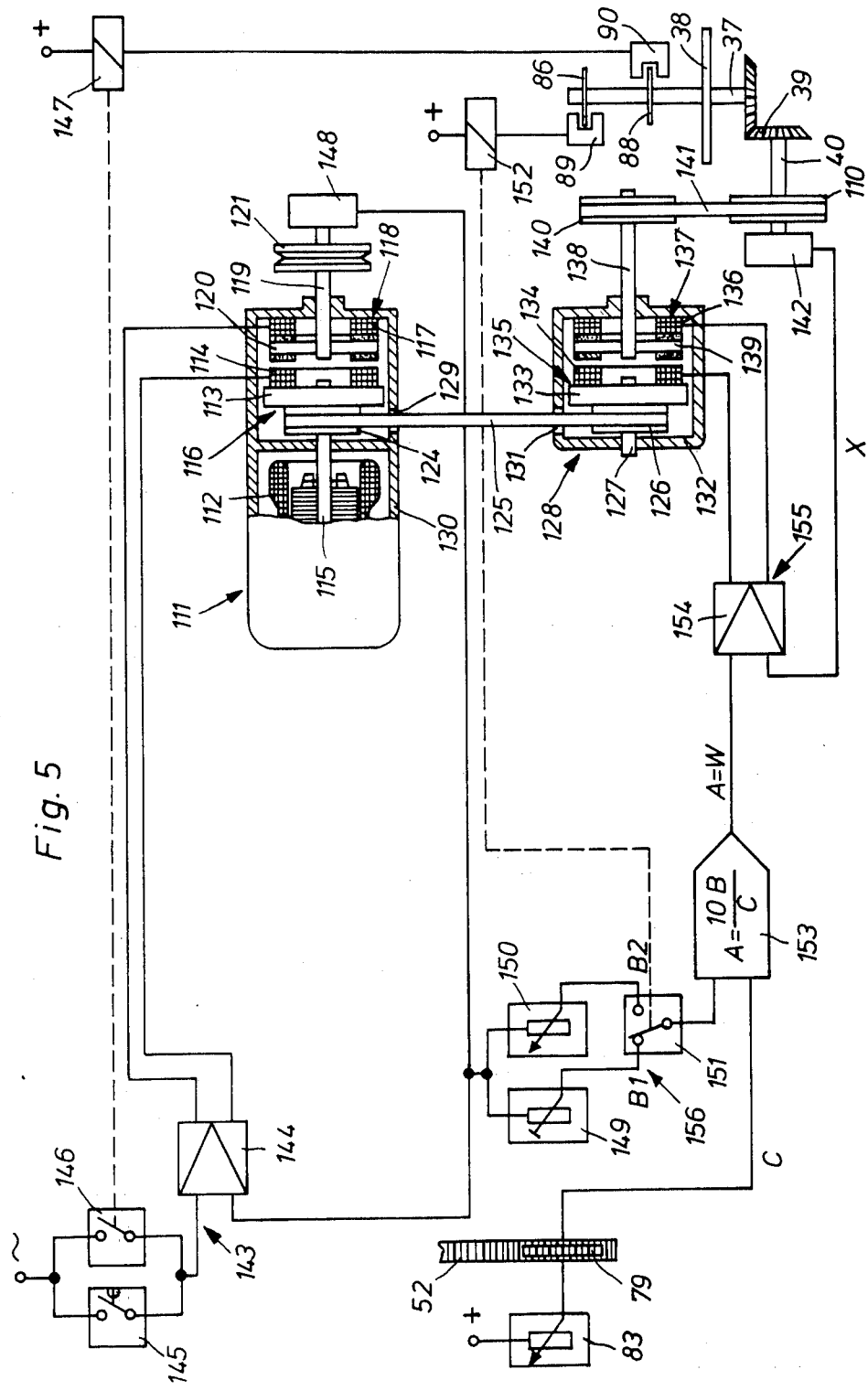
FIG. 5 is a block diagram of the regulating and control circuit of the motor and the separate clutching device.

The drive motor 111, diagrammatically shown in FIG. 5, is a so-called positioning motor. Motor 111 comprises a motor part proper at 112, a coupling part 116 which is connected to the motor shaft 115 and includes a flywheel 113 and a field coil 114, a braking part 118 including a field coil 117 and fixed to the housing, and an axially displaceable coupling and braking disc 120 which is provided between coupling part 116 and braking part 118 and is non-rotatably secured to an output shaft 119. Secured to output shaft 119 is a pulley 121 which is drivably connected through a V belt 122 to a pulley 123 secured to arm shaft 8 (FIG. 1).

Firmly connected to flywheel 113 of drive motor 111 is a pulley 124. A V belt 125 passed around pulley 124 drives through a pulley 126 the input shaft 127 of a controllable clutch 128. V belt 125 runs through an opening 129 of motor housing 120 and an opening 131 of clutch housing 132.

In a way similar to drive motor 111, clutch 128 comprises a clutch part proper at 135 mounted on an input shaft 127 and including a flywheel 133 and a field coil 134, a braking part 137 fixed to the housing and carrying a field coil 136, and an axially displaceable coupling and braking disc 139 which is provided between coupling part 135 and braking part 137 and nonrotatably secured to an output shaft 138. Secured to output shaft 138 is a pulley 140 which is drivably connected through a V belt 141, to a pulley 110 of identical diameter secured to shaft 40, so that shafts 40 and 138 rotate at the same speed. A tachogenerator 142 is secured to the end of shaft 40.

A main switch (not shown) is provided for switching drive motor 111 on and off. The coupling and braking parts 116, 118 of the motor are operated by a control circuit 143 known per se, such as disclosed, for example, in German Pat. No. 17 63 693. Control circuit 143 comprises a variable-gain amplifier 144 having two inputs and two outputs. The first input is associated with a switch 145 for starting the operation of the sewing machine and for switching off automatically with a time delay, and with a switching contact 146 connected in parallel to a relay 147. Through this input, a desired speed value signal of arm shaft 8 is supplied to amplifier 144. The other input of amplifier 144 is connected to a tachogenerator 148 which is secured to arm shaft 8 or, in the present example of FIG. 5, to output shaft 119, and whose output voltage represents the actual speed of arm shaft 8 or output shaft 119. One of the two outputs of amplifiers 144 is connected to field coil 114 of coupling part 116 and the other output is connected to field coil 117 of braking part 118.

The output voltage of tachogenerator 148 is supplied simultaneously to two manually adjustable potentiometers 149, 150 of which one 149 serves to set the stitch length $1_{SP}$ of tension stitches SP and the other 150 to set the stitch length $1_{ZZ}$ of zig-zag stitches ZZ. The output voltage B1, B2 of the two potentiometers 149, 150 is supplied via a two-position contact 151 of a relay 152 alternately to a first input of a dividing element 153 as a dividend. Potentiometer 83, coupled mechanically with gearing 91, serves to set the bar length $1_R$. The output voltage C of potentiometer 83 is applied as a divisor to a second input of the dividing element 153.

The dividing element 153 is a four-quadrant analog multiplier ICL 8013 of Intersil with the function $A = 10B/C$ operated as a division circuit. The factor 10 results from the internal construction of the dividing element 153.

The output voltage A of divider 153 is applied as a control variable W representing the desired speed of output shaft 138 of clutch 128, to a first input of a variable-gain amplifier 154 which also has two inputs and two outputs, as does amplifier 144. The other input is connected to tachogenerator 142 whose output voltage is the controlled variable X representing the actual speed of output shaft 138. One of the two outputs of amplifier 154 is connected to field coil 134 of clutch part 135, and the other output is connected to field coil 136 of braking part 137.

Variable gain amplifier 154, clutch 128 and tachogenerator 142 jointly form a control circuit 155. Tachogenerator 148, the potentiometers 83, 149, 150 and the dividing element 153 form together a control device 156 for the formation of the control variable W for control circuit 155.

The slot switch 89 acting as path dependent switch is connected with the relay 152, which upon release of slot switch 89 switches the make-and-break contact 151 in such a way that the potentiometer 149 which serves to set the tension stitch length $1_{SP}$ is connected with the dividing element 153. The slot switch 90 which also acts as path dependent switch is connected with relay 147, which upon release of the slot switch 90 switches contact 146 to open position, thus resetting the desired speed value of drive motor 111 to zero.

Figure 7:
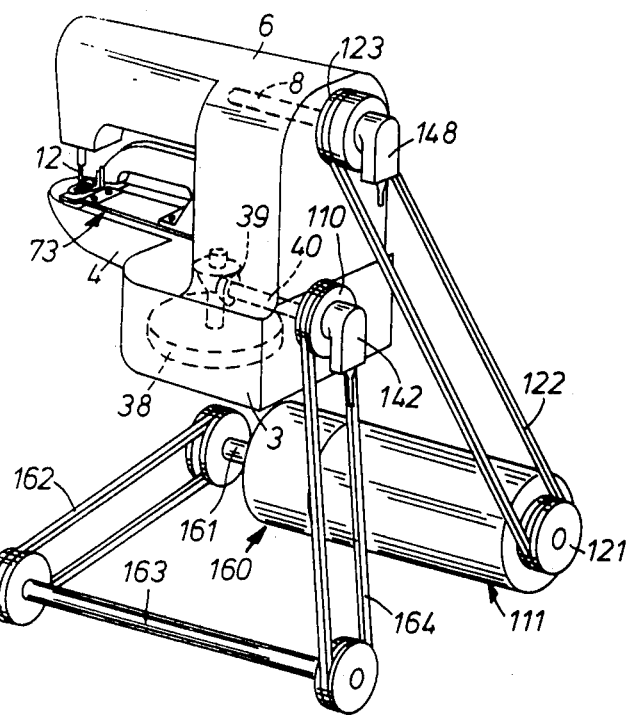
FIG. 7 and 8 are similar to FIG. 1 but showing other inventive embodiments.

FIG. 7 shows another embodiment of the drive, in which the coupling or clutch mechanism 160 is directly connected to the drive motor 111. In this case the swing pulley 133 (FIG. 5) is directly fastened to the motor shaft 115. The output shaft 138 (of FIG. 5) corresponding to output shaft 161 of the coupling mechanism 160 in FIG. 7, is connected to the belt pulley 110 over a belt pulley 162, main drive shaft 163 and a belt pulley 164.

Figure 8:
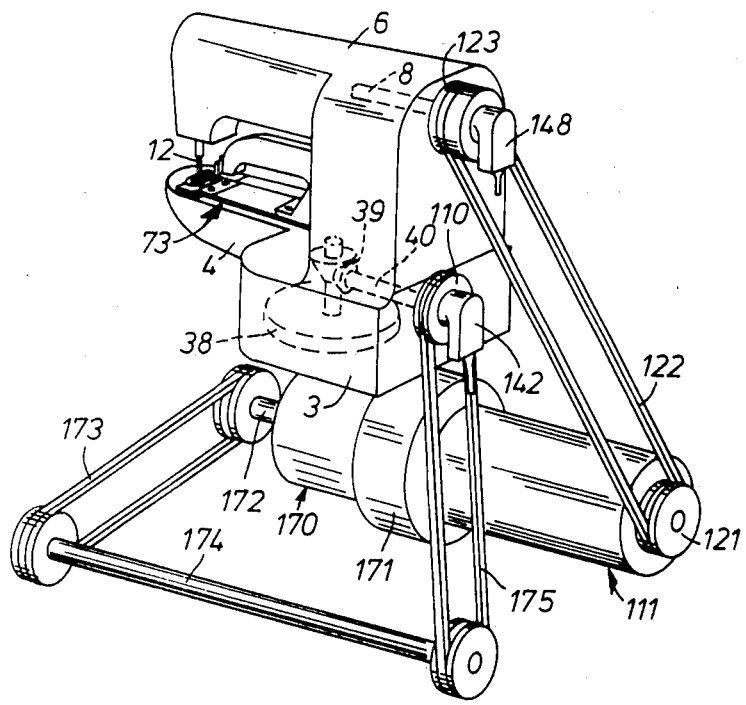

FIG. 8 shows a further embodiment in which the coupling mechanism 170 is connected under interposition of a reduction gear 171 at the end of the drive motor 111. The output shaft 172 of the coupling mechanism 170 is connected over a belt drive 173, a main drive shaft 174 and a belt pulley 175, to be driven with the belt pulley 110.

The stitch group sewing machine operates as follows:

At the start of the work, motor part 112 of drive motor 111 is switched on by means of the main switch (not shown). This motor part 112 then continues running even during the breaks between the individual sewing operations and is switched off again only at the end of the work. The continuous rotation of motor shaft 115 is transmitted through pulley 124 and V belt 125 to pulley 126 of the clutch 128, so that flywheel 133 also runs continuously.

The mode of operation of the sewing machine will be explained with reference to the formation of a type of stitch group referred to as bar seam. The bar seam illustrated in FIG. 6 comprises a series of straight tension stitches SP, which toward the end of the bar seam gradually change over to zig-zag stitches. The stitch length of the tension stitches SP is designated $1_{SP}$. At the end of the tension stitch seam lie one or more stitches designated as transverse stitches QS of zero stitch length $1_{ZZ}$, covering the tension stitch seam. At the end of the zig-zag seam are again one or more transverse stitches QS and one or more finishing stitches VS, which are formed at the site of the last transverse stitch QS.

Figure 6:
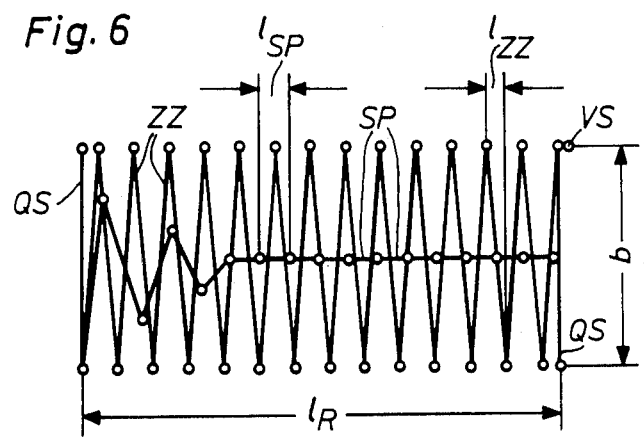
FIG. 6 is a plan view of a bar seam.
Figure 2:
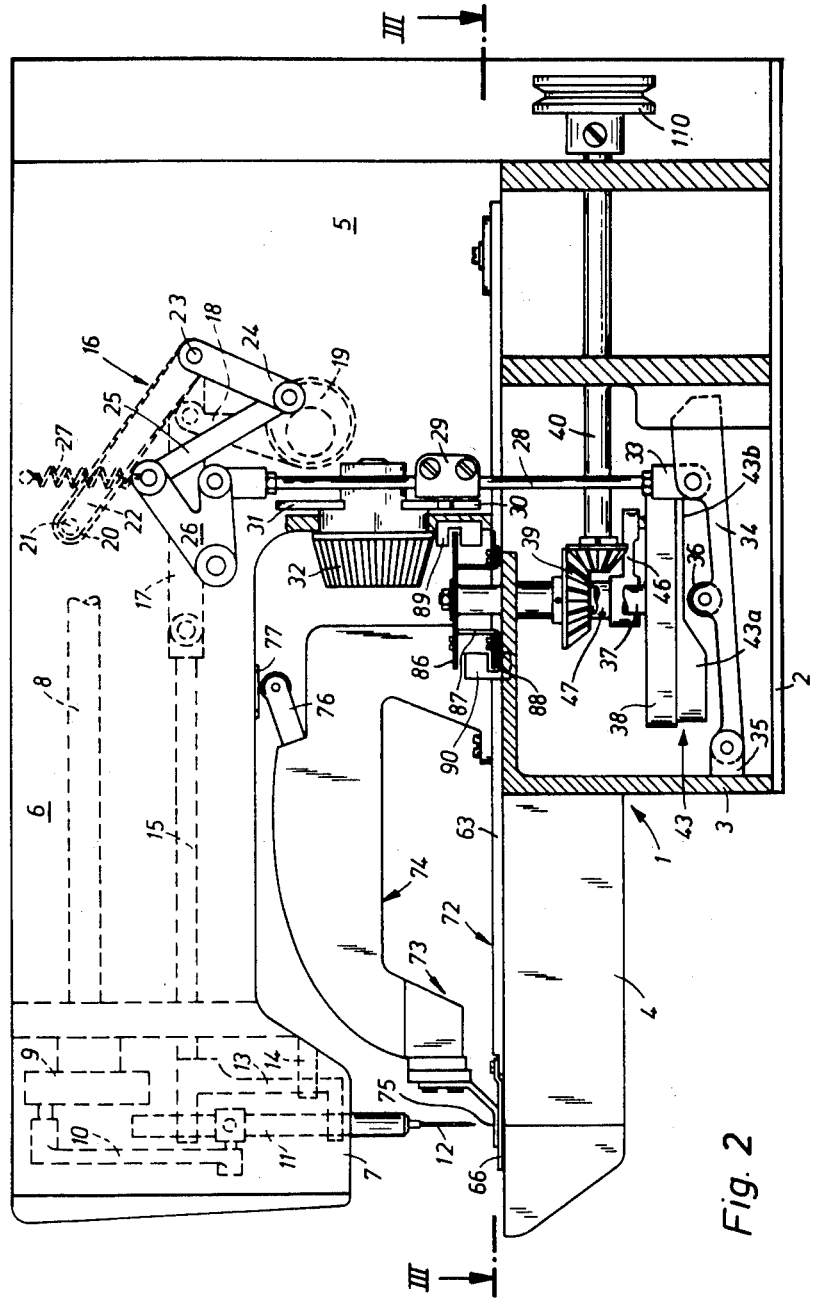
FIG. 2 shows a partial side elevational and sectional view of a stitch group sewing machine.

The bar seam illustrated in FIG. 6 comprises a total of 48 stitches and has a bar length $1_R$ of 40 mm. The 48 stitches are grouped in 16 tension stitches SP, 4 transverse stitches QS, 1 finishing stitch VS and 27 zig-zag stitches ZZ. The tension stitches SP have a stitch length $1_{SP} = 40/16$ mm $= 2.5$ mm, and the zig-zag stitches ZZ a stitch length $1_{ZZ} = 40/27$ mm $= 1.48$ mm.

For the formation of the bar seam according to FIG. 6, the cam plate 38 rotates at constant speed during the entire sewing process, that is both in the tension stitch and in the zig-zag region. For the formation of the tension stitches SP an angle of $(360 \times 16)/48 = 120°$ of the cam groove 44 is available. The transverse stitches QS, the zig-zag stitches ZZ, and the finishing stitch VS are distributed over the remaining 240°. In the tension stitch region the cam groove 44 has per stitch a greater radial rise than in the zig-zag region. The radial cam rise $\Delta r_{SP}$ in the tension stitch region is 1.285 mm, the radial cam rise $\Delta r_{ZZ}$ in the zig-zag region, 0.74 mm.

For the formation of the tension stitch SP, the speed of shaft 40 or the output speed $n_K$ of clutching device 128, which drives the cam plate 38 must be in a certain ratio to the speed $n_A$ of the arm shaft 8, to the bar length $1_R$, and to the stitch length $1_{SP}$. These various factors are in the following function relations $n_K$ is equivalent to $1_{SP} \times n_A / 1_R$.

For the formation of the bar seam according to FIG. 6, the slide 51 on supporting arm 50 is shifted to the left according to FIG. 3, through the setting lever 60, up to the limit of the setting range. In this position of slide 51 the driver 56 has the maximum possible distance from the axis of rotation of shaft 47, so that at gearing 91 the maximum transmission ratio is set. Upon displacement of slide 51, the holding strip 52 connected therewith and formed as a rack rotates the pinion 79 and adjusts the potentiometer 83 via shaft 80 to a value analagous to the transmission ratio of gearing 91. The potentiometer 149 for setting the stitch length $1_{SP}$ is always set to the stitch length 2.5 mm. The potentiometer 150 for setting the stitch length $1_{ZZ}$ is set to the value of the desired stitch length $1_{ZZ}$, that is, for the bar seam according to FIG. 6, to 1.48 mm.

The sewing machine is switched on by actuating switch 145. Drive motor 111 drives arm shaft 8 in a controlled manner, i.e. coupling part 116 and braking part 118 are alternately energized and the duration of the respective energizing periods is a function of the difference between the desired and the actual speed. During the first stitches arm shaft 8 is driven at 1,000 rpm. With the switching on, voltage is applied to potentiometer 83 and to amplifiers 144, 154. The output voltage C of potentiometer 83, which is dependent on the transmission ratio of gearing 91 and hence represents the bar length $1_R$ in analogous form, is continuously applied to the dividing element 153. The output voltage of tachogenerator 148 is applied simultaneously to the two potentiometers 149, 150.

As the sewing machine is being put in operation, segmental disc 86 is in a position outside the slot switch 89. With this position, contact 151 of relay 152 connects potentiometer 149 to dividing element 153 so that output voltage B1 is applied to the dividing element 153. The voltage B1 and C are divided in the division element 153 according to the formula $A = 10B/C$. B1 is the mathematical product of the analogous voltage values for the input variables $1_{SP}$ and $n_A$, and C is the analogous voltage value for the input variable $1_R$.

Output voltage A of dividing element 153 is applied as the control variable W of control circuit 155 to one input of amplifier 154.

Tachogenerator 142 in drive connection with shaft 138 of clutch 128 reproduces the speed $n_K$ of shaft 40 representing the controlled variable X in analogous manner as a d-c voltage. For a variance comparison, the output voltage of tachogenerator 142 is applied to the other input of variable gain amplifier 154.

The output voltage of amplifier 154 is applied to the coupling part 155 and the braking part 137 of clutch 128 in the same way as the output of amplifier 144 is applied to the respective parts of motor 111. The desired speed corresponding to control variable W is thus maintained very exactly. For example, when sewing the bar seam shown in FIG. 6, an arm shaft speed of 1,000 rpm will result in a speed $k_k$ of 17.8 rpm.

After making a few stitches, the speed $n_A$ of the sewing machine is increased to 4000 rpm. The output voltage of tachogenerator 148 thus increasing proportionally immediately brings about a corresponding increase of the output voltage B1 of potentiometer 149 and hence of the output voltage A of the dividing element 153, i.e. control variable W. The increase of control variable W leads directly to a corresponding increase of the speed $n_K$ of output shaft 138 to a value of 71 rpm.

At the time the sewing machine is switched on, the segmental disc 88 is in a position outside slot switch 90. Owing to this, contact 146 of relay 147 is open. After a short time clutch shaft 138 has rotated shaft 37 so that segmental disc 88 enters slot switch 90, and contact 146 of relay 147 closes. Only then switch 93 automatically switching off with delay, opens, so that from that instant voltage is applied to amplifiers 144, 154 throuch closed switching contact 146.

During the sewing of tension stitches SP, the steady drive of cam plate 38 and the continuous extension of cam groove 44 result in a steady pivotal displacement of lever 46. The pivoting movement of lever 46 is transmitted by supporting arm 50 and slide 51 adjusted thereon to driver 56 by which arm 63 is pivoted about its axis of rotation on sliding block 64.

The transmission ratio of gearing 91 determined by the position of slide 51, and the speed $n_k$ of output shaft 138 controlled as a function of the transmission ratio as well as of the speed $n_A$ and of the adjusted tension stitch length $1_{SP}$ produce the effect that the work holder 73 is pivoted by an amount of 2.5 mm within the area of opening 67 during each stitch formation so that correspondingly long tension stitches SP are made. The continuous pivotal movement of the work holder 73 does slightly tilt the needle 12 when piercing the work, but with a stitch length of 2.4 mm, the tilting is too small to cause a needle breakage of impairment of the thread binding or a visible damage of the work.

During the sewing of tension stitches SP, lever 34 is pushed down by the lower section 43a of the cam track 43 far enough for the tie rod 28 to hold the pitman 20 of the zig-zag stitch setter 16 in a substantially horizontal position parallel to lever 17. In this position of pitman 20 the oscillatory movements of lever 12 caused by eccentric 19 have no influence on the axial position of connecting rod 15, so that frame 13 and needle bar 11 execute no lateral movements.

Toward the end of the tension stitch interval, the section 43b of cam track 43 comes into the zone of sensing roller 36. By the action of tension spring 27 sensing roller 36 is moved upward, while pitman 20 along with bolt 21 are pivoted by roll 28 upwardly through crank 26, line 25, crank 24 and crank 22 rigidly connected thereto. Since lever 17 is connected to the pitman end opposite to bolt 21, the swinging motion of lever 17 caused by eccentricl 19 results in a swinging motion of pitman 20. Due to the displacement of bolt 21, the swinging motion of pitman 20 now has at the hinge point with lever 17 a horizontal component, which brings about that lever 17 and hence connecting rod 15 and the needle bar 11 execute lateral swinging movements in the rhythm of the stitch formation. Toward the end of the tension stitch interval, these lateral swinging causes a gradual transition from the straight tension stitches SP to the transverse stitches QS, which have the same bight b as the following zig-zag stitches ZZ.

The bight b is determined by the set position of cam plate 31. Cam plate 31 limits the upward movement of tie rod 28 caused by spring 27 in that it serves as a stop for roller 30.

After the control cam plate 38 has turned through the angle of 120° provided for the formation of the tension stitches SP, the segmental disc 86 enters into the slot switch 89 and switches relay 152, whereby contact 99 is switched and potentiometer 150 for setting the stitch length $1_{ZZ}$ of the zig-zag stitches ZZ is connected with the dividing element 153. Now the speed $n_K$ of output shaft 138 is approximately $(1_{ZZ} \times n_A)/1_B$.

Since the formation of the bar seam according to FIG. 6 of the ratio of stitch length $1_{SP}$ to stitch length $1_{ZZ}$ corresponds to the ratio of the radial rise $\Delta r_{ZZ}$ of cam groove 44 to the radial rise $\Delta r_{SP}$ and therefore the speed of output shaft 138 is the same as in the region of the zig-zag stitches ZZ as in the region of the tension stitches SP, the output voltage B2 of potentiometer 150 has in this case the same value as the output voltage B1 of potentiometer 149, so that the control variable W remains unchanged.

Toward the end of the sewing process, the speed $n_A$ of arm shaft 8 is reduced from 4000 rpm to 1000 rpm. Immediately thereafter, the speed $n_K$ of output shaft 138 is reduced in the same ratio by control device 156 and control circuit 155.

After one complete revolution of control cam plate 38, the finishing stitch VS is formed and the bar seam is completed. At this moment the two segmental discs 86 and 88 move out of the slot switches 89, 90, whereby through the two relays 147 and 152, contact 146 is opened and the drive connection to the sewing machine is interrupted and contact 151 is switched again so that potentiometer 149 is connected to dividing element 153. Output shaft 118 of motor 111 is braked almost instantly from the reduced speed to zero, owing to which also the output voltage of tachogenerator 149 is reduced to zero just as quickly. As a result, the control variable W becomes zero almost without delay and with equal rapidity output shaft 138 of clutch 128 is braked, so that the overtravel of cam plate 38 is insignificant.

If, starting with the bar seam according to FIG. 6, the bar length $1_R$ is to be shortened, then, via lever 60, the transmission ratio of gearing 91 is reduced while at the same time the potentiometer 83 is adjusted to a value proportional thereto. Since now due to the reduced output voltage C the divisor of dividing element 153 is reduced, output voltage A and the control variable W increase. As a result, output shaft 138 runs at a higher speed $n_K$. With a bar length $1_R=25$ mm, the speed $n_K$ increased both for the tension stitch and for the zig-zag stitch range, at a speed $n_A$ of 1000 rpm to 28.5 rpm and at a speed $n_A$ of 4000 rpm to 114 rpm. In connection with the smaller transmission ratio of gearing 91, the higher speed $n_K$ again results in a stitch length $1_{SP}$ of 2.5 mm in the tension stitch region and a stitch length $1_{ZZ}$ of 1.48 mm in the zig-zag stitch region. Now, however, the bar seam consists of fewer stitches.

If, at a constant stitch length $1_{SP}$ of 2.5 mm, the stitch length $1_{ZZ}$ in the zig-zag stitch region is to be reduced for example to 0.6 mm, the desired stitch length $1_{ZZ}$ is set on potentiometer 150 so that output voltage B2 is now smaller. After contact 151 has been stitched, a smaller dividend is supplied to dividing element 153 and output voltage A i.e. control variable W is reduced.

The result is that the speed $n_K$ of shaft 138 is now lower during the sewing in the zig-zag stitch region than earlier in the tension stitch region. While with a bar length $1_R$ of 40 mm and a speed $n_A$ of 1000 rpm the speed $n_K$ is the tension stitch region is again 17.8 rpm, in the zig-zag stitch region the speed $n_K$ drops to 9 rpm. At a speed $n_A$ of 4000 rpm, in the tension stitch region $n_K=71$ rpm and in the zig-zag stitch region $n_K=36$ rpm. The reduced speed $n_K$ in the zig-zag stitch region therefore shortens the stitch length $1_{ZZ}$ and increases the number of zig-zag stitches as compared to the bar seam according to FIG. 6.

While specific embodiments of the invention have been shown and described in detail to illustrate the application of the principles of the invention, it will be understood that the invention may be embodied othewise without departing from such principles.

We claim:

1. A stitch group sewing machine comprising a housing, a sewing needle mounted in said housing for upward and downward movement and for lateral swinging movement in a swinging plane, a sewing machine main drive motor for moving said needle in upward and downward and swinging motion, a work holder mounted on said housing for swinging movement across the swinging plane of said needle, a cam plate rotatable in said housing connected to said work holder by a transmission having a variable transmission ratio for controlling the swinging movement of said work holder, a controllable clutch device connected to said cam plate for rotating said cam plate, said drive motor being connected to said clutch device for driving said clutch device and said cam plate, and a control device connected to said main drive motor for controlling an output speed of said clutch device as a function of one of the speed of said sewing machine main drive motor, a ratio of said transmission and a length of the stitches to be formed, for varying a resultant stitch length.

2. A stitch group sewing machine according to claim 1, including a belt drive connected between said controllable clutch device and said main drive motor.

3. A stitch group sewing machine according to claim 1, wherein said main drive motor has an axial end connected directly to said controllable clutch device.

4. A stitch group sewing machine according to claim 1, including a reduction gear connected between said controllable clutch device and said main drive motor.

5. A stitch group sewing machine according to claim 1, wherein said control device includes a variable gain amplifier having one input for receiving a control variable corresponding to an output speed of said clutch device, and a second input for receiving a control variable corresponding to one of the sewing machine main drive motor speed, ratio of said transmission and length of the stitch to be formed, said variable gain amplifier having an output connected to said clutch device for controlling said clutch device.

6. A stitch group sewing machine according to claim 1, wherein a stitch group to be formed has at least two separate sections made of different types of stitches whose lengths are variable independently of each other, said control device comprising a displacement responsive switch which is actuatable after a partial rotation of said cam plate corresponding to lengths of stitches in a first one of said at least two sections for the stitch group.

7. A stitch group sewing machine according to claim 1, wherein said control device comprises two potentiometers each having an input, a tachogenerator connected to said sewing machine main drive motor and connected to the inputs of said two potentiometers for applying a signal corresponding to the speed of said sewing machine drive motor to said potentiometer, a double throw switch connected to said potentiometers for applying an output voltage of one of said potentiometers at a time, a displacement responsive switch associated with said cam plate and connected to said double throw switch for switching said double throw switch after said cam plate has rotated a selected amount, a divider connected to said double throw switch for receiving said one output voltage to be used in said divider as a dividend in said divider, a further potentiometer mechanically coupled to said transmission and variable with variations in said transmission ratio, said further potentiometer being connected to said divider for applying an output voltage of said further potentiometer to said divider as a divisor for said dividend to generate an output voltage from said voltage divider, said divider connected to said clutch device for applying said output voltage of said divider as a control signal for said clutch device.

* * * * *